United States Patent [19]
Bickford

[11] 3,864,668
[45] Feb. 4, 1975

[54] SEAT BELT WARNING AND IGNITION INTERLOCK SYSTEM

[75] Inventor: David Edward Bickford, Harrisburg, Pa.

[73] Assignee: AMP Incorporated, Harrisburg, Pa.

[22] Filed: Jan. 31, 1973

[21] Appl. No.: 328,224

[52] U.S. Cl. ............ 340/52 E, 340/278, 307/10 SB, 180/82 C, 200/61.58 B
[51] Int. Cl. ............................................. B60r 21/10
[58] Field of Search ......... 340/52 E, 278; 180/82 C; 307/10 SB; 200/61.58 B

[56] References Cited
UNITED STATES PATENTS

| | | | |
|---|---|---|---|
| 3,729,059 | 4/1973 | Redmond | 180/82 |
| 3,732,538 | 5/1973 | Gillund | 340/52 E |
| 3,740,567 | 6/1973 | Atkins | 307/10 SB |
| 3,742,448 | 6/1973 | Motz | 340/52 E |
| 3,748,640 | 7/1973 | Sardo | 340/52 E |

Primary Examiner—Alvin H. Waring
Attorney, Agent, or Firm—AMP Incorporated

[57] ABSTRACT

A seat belt warning and ignition interlock system including a capacitive occupant detector, a seat belt position sensor and a seat belt-occupant monitoring circuit functioning to provide a vehicle start disable signal and an alarm signal in response to a detected failure to achieve defined conditions relating to the position of a vehicle seat belt and the occupancy of the associated seat. The monitoring circuit produces a vehicle start disable signal if either an unoccupied seat has its associated seat belt buckled or if an occupant buckles his seat belt prior to occupying his seat in the vehicle.

4 Claims, 9 Drawing Figures

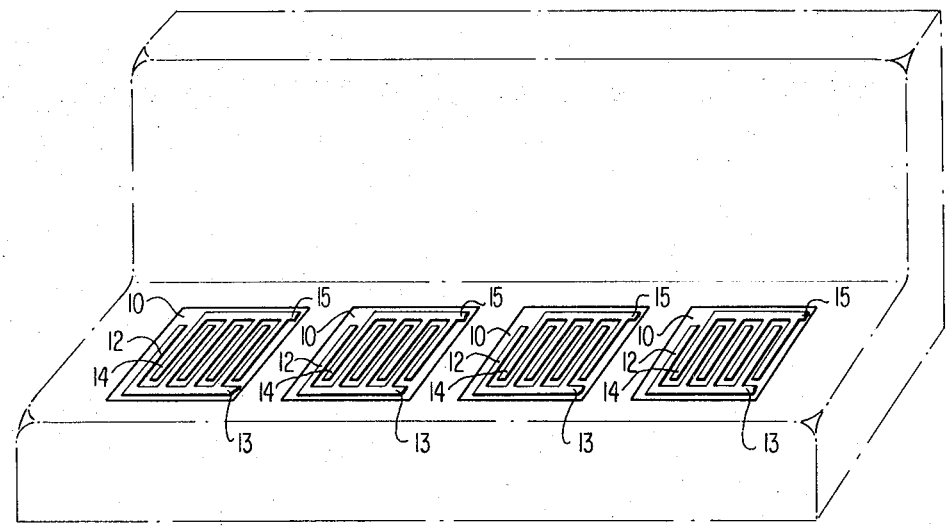
FIG. 2a
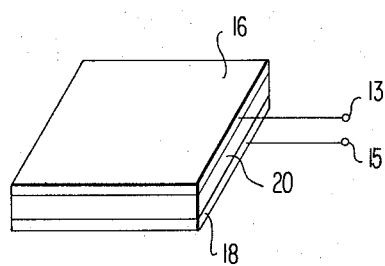
FIG. 2b
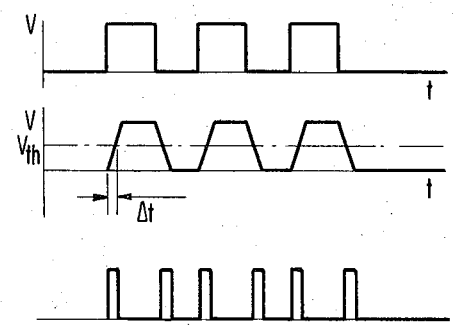
FIG. 3a
FIG. 3b
FIG. 3c
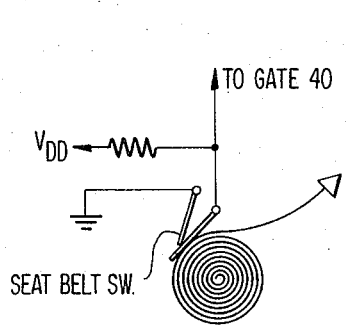
FIG. 4a
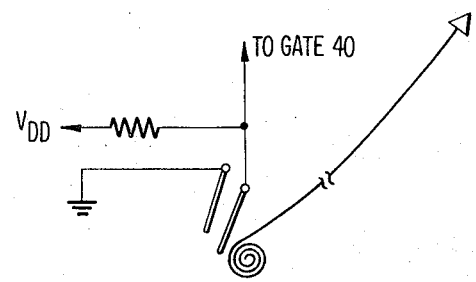
FIG. 4b

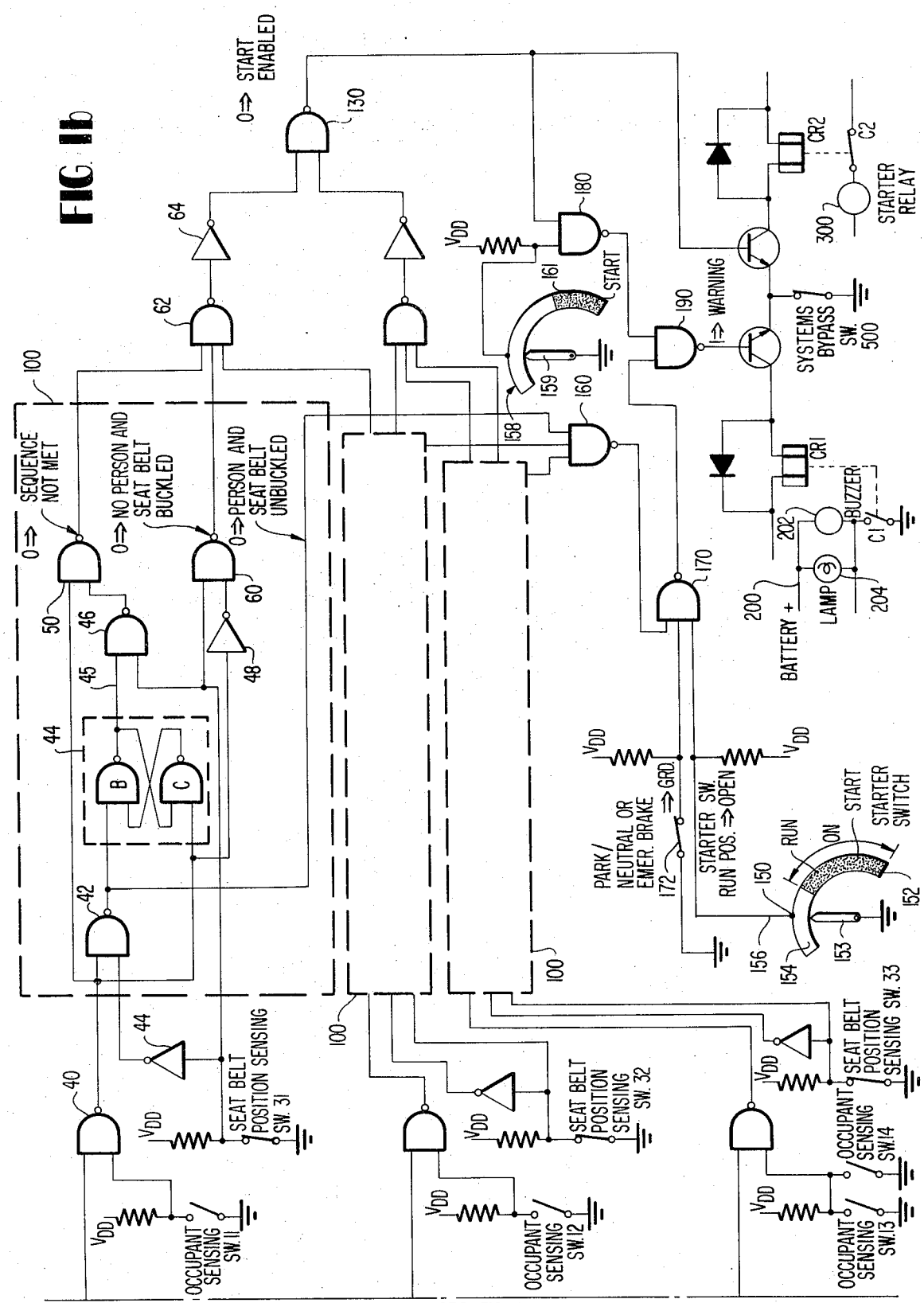

SEAT BELT WARNING AND IGNITION INTERLOCK SYSTEM

BACKGROUND OF THE INVENTION

It is well accepted that the occupant of a moving vehicle may be protected against serious bodily injury when the vehicle is involved in a collision if he is secured in his seat by means of a seat belt. Although various safety campaigns have been instituted stressing the importance of wearing a seat belt, many individuals continue to drive with their seat belts unbuckled. As a result, both industry and government have begun to develop seat belt systems, which in essence force the vehicle operator and his passengers to buckle their seat belts. Such systems include those which produce an audible and/or visual alarm if an occupant fails to buckle his seat belt, as well as, those which include, in addition to, or in place of, the alarm, an ignition interlock circuit generating a vehicle disable signal which prevents the vehicle from starting when an occupant's seat belt is unbuckled.

Such systems suffer various disadvantages. For example, mechanical switches which flex to a closed position in response to the presence of an individual are used as occupant sensors. Such switches have been found to be unreliable and often fail to operate properly. Operational failure has been attributed to the many openings and closings which these switches must withstand and unfortunately, do not.

Another problem relates to the ease with which these systems can be overridden by the vehicle occupant. For example, in systems which monitor merely the coincidence between an occupied seat and the buckling of the associated seat belt, the vehicle occupant merely has to buckle the belt behind him to fool the system.

SUMMARY OF THE INVENTION

It is an object of this invention to overcome the above-described deficiencies of the prior art seat belt sensing and ignition interlock systems.

It is a specific object of the invention to provide a reliable and inexpensive occupant detecting device.

It is a further object of the invention to provide a seat belt-occupant monitoring device operating in conjunction with the occupant detector to monitor not only the coincidence between the occupying of a seat and the buckling of the associated seat belt, but also, the sequence of these events to assure that the seat belt is buckled only after an individual has taken his seat in the vehicle.

These and other objects, as set forth in greater detail below, are accomplished in accordance with the teachings of this invention by providing a capacitive occupant detector circuit, which includes a capacitive occupant sensor coupled to a pulse generator-pulse coincidence detecting circuit operating to provide a digital output indicative of whether or not a vehicle seat is occupied.

The capacitive occupant detector and a seat belt position sensing circuit are coupled to a seat belt-occupant monitoring circuit which provides a start disable signal to the vehicle ignition system if either an unoccupied seat has its associated seat belt buckled or if a seat belt is buckled before an occupant is seated. An alarm circuit is provided to produce audible and visual alarm signals simultaneously with the start disable signal. In addition, should an occupant unbuckle his seat belt after the vehicle has started, the alarm signals are triggered.

BRIEF DESCRIPTION OF THE DRAWINGS

FIGS. 1a and 1b comprise a detailed schematic diagram of the seat belt warning and ignition interlock system of the invention;

FIGS. 2a and 2b illustrate capacitive occupant sensors;

FIGS. 3a – 3c illustrate the wave forms at the inputs to the coincidence detector circuit of the capacitive occupant detector when a seat is occupied; and FIGS. 4a and 4b illustrate an example of a seat belt position sensing switch for indicating whether the seat belt is in its retracted or extended position.

DETAILED DESCRIPTION OF THE PREFERRED EMBODIMENTS

Figure 1A:
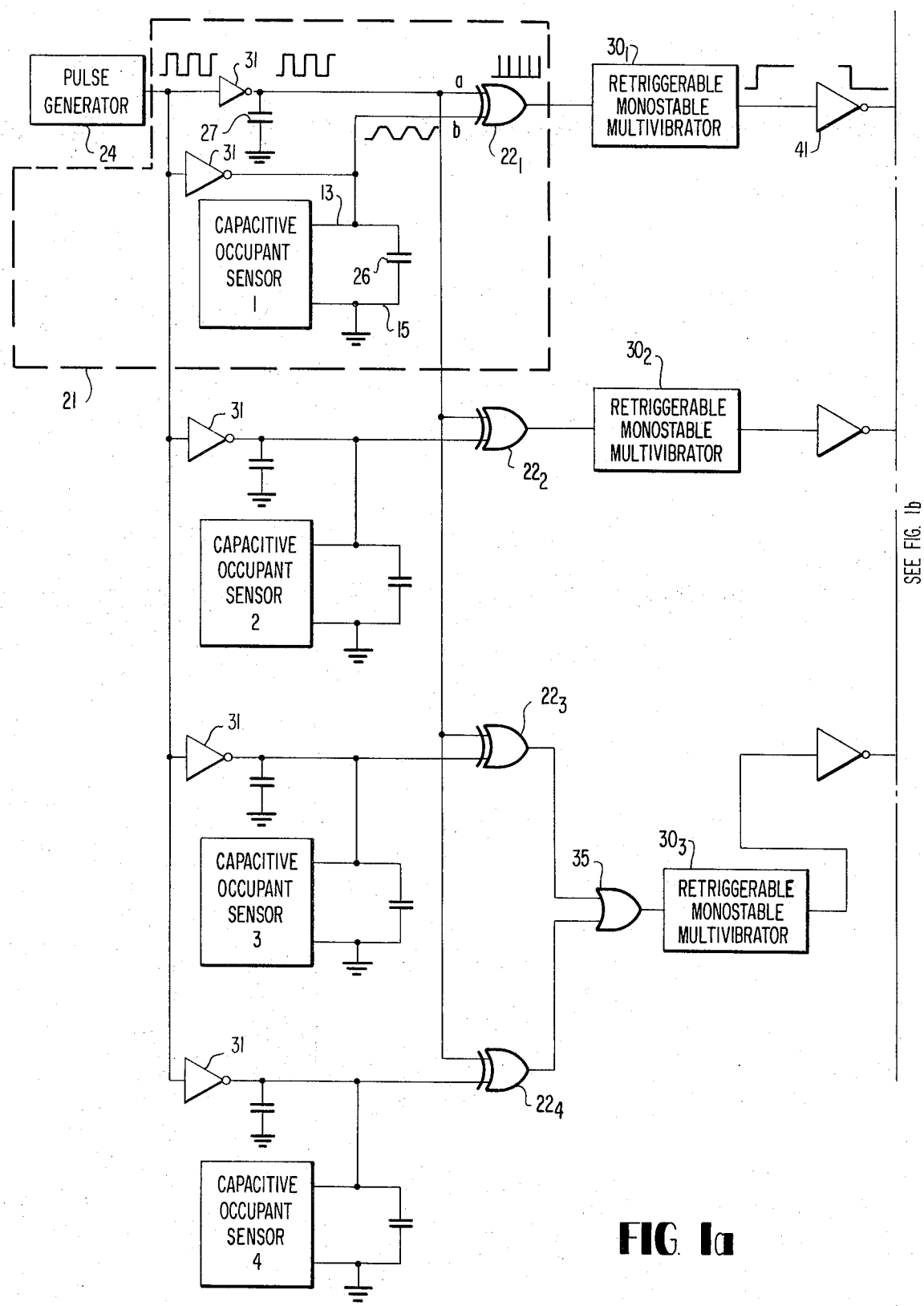

Before referring specifically to the accompanying drawings, it would be well to outline the significant features of the instant invention. The two primary features of the inventive seat belt sensing and ignition interlock system are the capacitive occupant detector and the seat belt-occupant monitoring circuitry, responsive to the capacitive occupant detector and a seat belt position sensing circuit. The seat belt position sensing circuit, which may include a mechanical switching element, responsive to the position of the seat belt, provides an electrical indication as to whether or not the seat belt is in its buckled condition. The seat belt-occupant monitoring circuit monitors a variety of conditions and provides a start disable signal and/or an alarm signal if any one of a plurality of predetermined conditions are not met.

More specifically, a system which merely monitors the coincidence of a seated individual and a buckled seat belt can be easily fooled by the occupant by merely buckling the seat belt behind him and leaving it in this position. To overcome this problem, the monitoring circuit must not only be able to detect coincidence between an occupied seat and a buckled seat belt, but also the sequence in which these events take place. The system should also be provided with a measure of protection against an individual who seeks to override the system by following the proper sequence and subsequently unbuckling his belt.

Meeting the above outlined criteria, the monitoring system of the present invention provides a start disable signal to a normally deenergized relay. Associated with this relay is a normally closed pair of contacts situated in the vehicle starter relay circuit. Thus, energization of the start relay, in response to a start disable signal, causes its associated contacts to open, preventing energization of the vehicle starter relay.

A start disable signal will result if either of the following two conditions are not met. First, the occupant of the seat must first be seated and then buckle his seat belt. Secondly, all unoccupied seats must have their associated seat belts unbuckled. The monitoring circuitry which effects the start disable signal is also provided with alarm circuitry generating an alarm trigger signal, which is applied to visual and audible alarms if either of the above two conditions are not met.

A further deterrent to unsafe operation of the vehicle is provided by incorporating into the monitoring circuit an additional alarm circuit responsive to an indication that an occupant in a moving vehicle has unbuckled his seat belt.

The other primary feature of the invention lies in the unique capacitive occupant detector circuit. This detector is comprised of a capacitive occupant sensor connected to a pulse generator-coincidence detector circuit. Capacitive seat sensors, per se, are known in the art, one such sensor being described in U.S. Pat. No. 3,177,967 to Wilson. The Wilson patent does not use the capacitive seat sensor in combination with a seat belt warning and ignition interlock system and in addition, requires complex and costly circuitry coupled to the sensor for providing a signal indicative of the fact that an occupant is seated in the vehicle. The present capacitive occupant detector improves upon the device described in the aforementioned patent by providing a simple and reliable pulse generator-coincidence detector circuit, responsive to the output of the sensor, for providing a digital indication of an occupied seat position.

FIG. 1 illustrates the seat belt warning and ignition interlock system of the present invention as applied to a three passenger vehicle seat. It should be noted that the circuitry associated with each capacitive occupant sensor 1–4 is identical and thus, the specific circuitry will be described with reference to one seat position only. The operation of the circuitry associated with the other seat sensors, is identical to that described in detail.

In general, the capacitive occupant sensors 1–4 are positioned below seat cushions. Occupant sensors 1 and 2 are positioned in the area of the driver's seat and the right most passenger seat, respectively. Two occupant sensors 3 and 4 are located in the center portion of the seat in order to detect an individual who is sitting in a positoin offset from the center of the seat. For example, if an individual is sitting to the left of center, close to the driver, occupant sensor 3 would sense the individual. On the other hand, if the individual is sitting to the right of center towards the right most passenger position, he will be sensed by occupant sensor 4. If he is seated precisely in the center of the seat, he will be detected by both occupant sensors 3 and 4. As will be explained in greater detail below, simultaneous activation of occupant sensors 3 and 4 has no harmful effect upon the system operation.

The capacitive sensor may take either two forms, as illustrated in FIGS. 2a and 2b. The configuration of FIG. 2a is preferable. FIG. 2a illustrates not only the configuration of the capacitive sensor, but also the preferred relative positions of the four sensors in a three passenger vehicle seat. In FIG. 2b a single sensor element is illustrated. It is to be understood, that when such a configuration is used, four such elements would be used in the seat, they being positioned as illustrated in FIG. 2a.

Referring again to FIG. 2a, each capacitive sensor is comprised of a plurality of interleaved conductive fingers 12, 14 positioned in a common plane and mounted on a dielectric 10. These fingers form the plates of a capacitor. If desired, the top surface of each capacitive sensor can also be covered by a layer of insulation to thereby encapsulate the capacitive plates, protecting them from mechanical wear. Fingers 12 are all interconnected and attached to conductive lead 13, while fingers 14 are interconnected and coupled to lead 15. In operation, when a seat position is unoccupied the associated capacitive sensor provides a first capacitance across conductive leads 13 and 15. As a person is seated, his body alters the field between the plates of the capacitor, thus changing the value of the detected capacitance. It has been determined, that for a capacitive sensor having an initial capacitance on the order of 300 pf. when its corresponding seat position is unoccupied, occupation of the seat causes the capacitance to rise between 50 and 100 pf.

The capacitive sensor of FIG. 2b includes first and second capacitive plates 16, 18 situated on opposite sides of dielectric 20. Plates 16 and 18 are coupled to leads 13, 15. As a person occupies a seat position associated with such a capacitive sensing element, plates 16, 18 are forced closer to each other, thus increasing the value of the capacitance across the associated conductive leads 13, 15. Such a capacitive sensor is illustrated in the above mentioned Wilson patent. A difficulty with such a configuration is that repeated compression and expansion of the dielectric material severely curtails the effective life of the sensor.

Returning to FIG. 1, and referring only to the circuitry 21 associated with capacitive occupant sensor 1, conductive lead 15 is coupled to a reference potential which may be ground potential, while conductive lead 13 is connected to one input b of a coincidence detecting circuit comprised of an exclusive OR circuit $22_1$. The exclusive OR circuit $22_1$ operates in conjunction with its associated capacitive sensor 1 and a pulse generator 24 to provide a series of pulses at the output of circuit $22_1$ in response to a detected change in the rise time of the input pulse signals to one of the two inputs thereto.

More specifically, pulse generator 24, which may be a conventional oscillator, produces a train of pulses which are applied simultaneously to inputs a and b of the exclusive OR circuit $22_1$. Pulse generator 24 is continuously running being coupled directly to the vehicle's battery. The value of the capacitance at inputs a and b of the exclusive OR circuit $22_1$ are adjusted such that when the seat position corresponding to capacitive occupant sensor 1 is unoccupied, the rise times of the pulses applied to both inputs a and b are substantially identical. Thus, the output of exclusive OR circuit $22_1$ remains at a logic 0. Control of the rise time of signals applied to the circuit $22_1$ can be effected by adjusting capacitors 26 and 27.

When the seat position becomes occupied, the capacitance across conductive leads 13, 15 increases thereby changing the rise time of the pulses appearing at the b input to exclusive OR circuit $22_1$.

To isolate the change in capacitance at occupant sensor 1 from exclusive OR circuits $22_2 - 22_4$, inverters 31 are positioned between the pulse generator 24, common to all of the detector circuits, and the capacitive occupant sensors 1–4. As is known, an exclusive OR circuit has a threshold level below which an input thereto appears as a logic 0 and above which an input appears as a logic 1. Referring to FIGS. 3a and 3b, which illustrate, for the purposes of explanation, the input waveforms to inputs a and b of circuit $22_1$, respectively, when the seat position above capacitive occupant sensor 1 is occupied, it can be seen that over a time period $\Delta t$ the a input is above the circuit threshold $V_{th}$ while the b input is below this threshold which results in a logic 1 appearing at the a input and a logic 0 at the b input of circuit $22_1$ over time interval $\Delta t$. As a result, over this time interval, the output of circuit $22_1$ goes to a logic 1, as illustrated in FIG. 3c. In actuality, the change in rise time is not as exaggerated as illustrated and the output of circuit $22_1$ appears as a series of extremely narrow pulses.

The occupant indicating pulse train from the output of the capacitive occupant detector 21 is applied to a conventional retriggerable monostable multivibrator $30_1$. This multivibrator is selected to have a time constant greater than the period of the occupant indicating pulse train. As a result, the output of the retriggerable multivibrator $30_1$ appears as a square wave, having a duration equal to the duration of the occupant indicating pulse train.

To protect against failure of the capacitive occupant detector 21, the occupant sensing portion of the system may include a mechanical occupant sensing switch 11 functioning as an additional occupant sensing device. One of these mechanical sensing switches would be associated with each capacitive occupant sensor. These mechanical occupant sensing switches are designated in FIG. 1 as occupant sensing switches 11 – 14. Such switches are conventional and do not, per se, form a portion of the invention. In general, they are comprised of two conductive strips positioned in separate horizontal planes. As an individual occupies a seat position, the strips are forced together, thereby closing the switch. Occupant switch 11, as are the other switches, is coupled to potential source $V_{DD}$, with one input to NAND circuit 40 being connected to the node between the source $V_{DD}$ and the mechanical occupant switch 11. The other input to NAND circuit 40 is connected to the output of the monostable multivibrator $30_1$ through inverter 41. NAND circuit 40 operates as an inverting OR circuit. That is, if either input to NAND circuit 40 is a logic 0, the output goes to a logic 1, indicating that the seat position is occupied. More specifically, when the seat position corresponding to the position of the capacitive occupant sensor 1 and the mechanical occupant switch 11 is occupied, switch 11 closes, causing the lower input to NAND circuit 40 to assume ground potential corresponding to a logic 0. Throughout the specification, ground potential is defined as a logic 0. Since the output of multivibrator $30_1$ is a logic 1 when the seat position is occupied, the upper input to NAND circuit 40 is also low, due to the action of the inverter 41.

The system is also provided with a seat belt position sensing circuit comprised of a seat belt position switches 31–33 and their associated potential source $V_{DD}$. The function of these seat belt position sensing switches is to provide an indication as to whether the seat belt is extended or retracted. The closed position of the seat belt switches, as shown in FIG. 1 corresponds to a retracted seat belt. Upon extending the seat belt, the corresponding seat belt switch opens.

FIGS. 4a and 4b illustrate one configuration of a seat belt position sensing switch. This configuration is conventional. As shown in FIG. 4a, when the belt is in the retracted position, the seat belt switch is closed. As the belt is extended, one contact of the switch, which is biased in a direction away from its opposing contact, moves to bring the switch to the open position.

The above three described condition sensing elements of the system, that is, the capacitive occupant detector, the mechanical occupant sensing switch device and the seat belt position sensing switch device, are coupled to the seat belt-occupant monitoring circuit 100 of the invention. This circuit will now be described in detail. The monitoring circuit monitors essentially three conditions. First, the sequence of buckling a seat belt and the act of occupying the corresponding seat position. Second, the state of the seat belts in the unoccupied seats, that is, whether they are buckled or unbuckled and finally, the state of the seat belts in the occupied seat positions. The monitoring circuit is connected to both a start disable circuit, which is responsive to conditions one and two, and also, an alarm circuit responsive to all three conditions.

The operation of the monitoring circuit may best be understood by describing its operation in response to individual conditions. The vehicle starter switch will preferably include a pair of gauged conductive wiper arms 153 and 159 which sweep across pieces 150 and 158, respectively, as the ignition key is rotated in the ignition switch from the off to the run and then start position. As will become clearer with the following discussion, two pieces 150 and 158 are used rather than one to permit an occupant to remove his seat belt after the vehicle has been started and not trigger the alarms 200 so long as the vehicle transmission is in its neutral or park position and/or the emergency brake is set. Portion 154 of piece 150 which corresponds to the off position of the switch is electrically conductive, while portion 152 is made of nonconductive material. Portion 161 of piece 158 is of nonconductive material and corresponds to the start position of the switch. Thus, when wiper arm 153 is in engagement with the off portion 154 of the arm 150, lead 156 is at ground potential, providing a logic 0 at one input of NAND gate 170. If the output of gate 180 is at a logic 1, a logic 0 appears at the output of gate 190 thereby disabling relay CR 1 to prevent normally opened contact C 1 from closing. Normally open contact C1 of relay CR1 is in the alarm circuit 200, which includes buzzer 202 and lamp 204. As can be seen, the output of gate 180 will always be a logic 1 when the ignition switch is at any position other than the start position 161.

When the vehicle starter switch is moved to the start position, conductive wiper arm 159 moves to the nonconductive portion 161 of piece 158 causing one input of gate 180 to rise to a logic 1. Should a logic 1 also appear at the other input of gate 180, its output goes to a logic 0. This logic 0 disables gate 190 causing a logic 1 to appear at the output of gate 190. This logic 1 energizes relay CR1 to trigger alarm circuit 200 which results in the sounding of the buzzer 202 and the lighting of the lamp 204.

During the start operation, the vehicle transmission is placed in either the neutral or the park position and/or the emergency brake is set. Under any of these condition, switch 172 is closed, disabling gate 170 and enabling gate 190. As explained above, gate 180 is, however, enabled through the action of arm 159. Its output will go to a logic 0, forcing the output of gate 190 to a logic 1 to trigger the alarm circuit 200 if a start disable signal, that is a logic 1, is produced by gate 130. In addition, a logic 1 at the output of gate 130 also causes relay CR 2 to energize, opening normally closed contact C2 to disable the vehicle starter relay and thus prevent starting.

A logic 1, that is a vehicle start disable signal, is realized at the output of gate 130 if any input thereto is a logic 0. These inputs are derived from the seat belt-monitoring circuits associated with the various seat positions of the vehicle. Referring to the monitoring circuit 100 associated with the seat belt position sensing switch 31, remembering that all of the other monitoring circuits are identical, this circuit presents a logic 0 to one input of gate 130 if any input of gate 62 is at a logic 0. Such a logic 0 results if either the required sequence is not met or if the seat position is unoccupied with its corresponding seat belt buckled.

The operation of the monitoring circuit will now be described. In the initial state, when the seat position is unoccupied and the seat belt unbuckled, the gate 40 provides a logic 0 to one input of gate 42 and to the lower input of flip-flop circuit 44. The lower input to gate 42 is at a logic 1 through the operation of the inverter 44, since seat belt position sensing switch 31 is closed. Therefore, the upper input to flip-flop 44 is at a logic 1 causing its output 45 to be at a logic 0, disabling gate 46. Under these conditions, the output of gate 50 is at a logic 1.

If an individual now occupies the seat position, the output of gate 40 goes to a logic 1. Simultaneously, the output of gate 42 goes to a logic 0, since its two inputs are now at a logic 1, while the lower input to flip-flop 44 goes to a logic 1 causing output 45 to assume a logic 1 state. This causes the output of gate 50 to assume a logic 0 state indicating that the required sequence has not been met. If the individual now buckles his seat belt, seat belt positioning sensing switch 31 opens, causing the lower input to gate 42 to go to a logic 0, raising the output of gate 42 to a logic 1. However, no change is seen at the output 45 of flip-flop 44 and thus, the upper input to gate 46 remains at a logic 1. Since the seat belt position sensing switch 31 has now opened, the lower input to gate 46 goes to a logic 1 causing the lower input of gate 50 to go to a logic 0. This results in a logic 1 at the output of gate 50, indicating that the required sequence has been met.

To see what occurs if the sequence has not been met, it will be assumed that the seat belt has been buckled before an individual occupies the seat position. It should be remembered that the upper input to the flip-flop 44 was initially at a logic 1, while the lower input thereto was at a logic 0 causing output 45 to be at a logic 0. This caused the output of gate 46 to be at a logic 1.

When the seat belt is buckled, the seat belt position sensing switch opens, causing the lower input to gate 46 to attain a logic 1. Since no one is seated at this time, the output of flip-flop 44 does not change and remains at a logic 0. When the seat position becomes occupied, the upper input to gate 50 attains a logic 1 state, while the output of gate 46 remains at a logic 1 to produce a logic 0 at the output of gate 50 indicating that the required sequence has not been met. More specifically, when the seat position becomes occupied, the output of gate 42 does not change, since it has been disabled by the logic 0 from the inverter 44 and thus, the upper input to the flip-flop 44 remains at a logic 1. The lower input does change to a logic 1, but gate C of flip-flop 44 is disabled by the output of gate B of the flip-flop which is at a logic 0. Thus, the output of gate C remains at a logic 1. This causes gate 46 to be disabled and gate 50 sees a logic 1 at each input thereto, producing a logic 0 at its output indicating that the sequence has not been met.

Referring now to the operation of gate 60, the output of this gate goes to a logic 0 if an unoccupied seat position has its corresponding seat belt buckled. One input to gate 60 is connected to the seat belt position sensing switch 31, while its other input is connected to the output of gate 40 through inverter 48. When the seat position is unoccupied, gate 40 produces a logic 0 which appears at one input of gate 60 as a logic 1. When the seat belt is buckled, the other input of gate 60 rises to a logic 1 and thus, a logic 0 is produced at the output of gate 60. This logic 0 disables gates 62 and 130, to produce a start disable signal, that is, a logic 1, at the output of gate 130.

The protection scheme against a passenger removing his seat belt while the vehicle is moving will now be described. When the vehicle is moving, gate 170 is enabled since the starter switch is in its run position and thus, contact 153 is in contact with the non-conductive portion 152 of piece 150, while the vehicle is neither in park or neutral. The third input to gate 170 is controlled by the output of gate 160, the inputs of which are coupled to the gates 42 of each of the seat belt-occupant monitoring circuits. Under the acceptable condition, all inputs to gate 160 are at a logic 1 since the lower input to gate 42 is at a logic 0, the upper input being at a logic 1 when the seat position is occupied. If the seat belt becomes unbuckled, the corresponding seat belt position sensing switch, for example, seat belt position sensing switch 31, closes, bringing the lower input to gate 42 to a logic 1. As a result, its output goes to a logic 0 bringing the output of gate 160 to a logic 1. Since all inputs to gate 170 are now at a logic 1, its output assumes a logic 0 state disabling gate 190 to provide a logic 1 at its output. This logic 1 energizes relay CR1 and thus, the alarm circuit 200 is triggered.

Returning now to the operation of the capacitive occupant sensors 3 and 4 and the mechanical occupant sensing circuits 13 and 14, the monitoring circuit associated with these sensors operates as if only one sensor was triggered even if both are triggered simultaneously. This results from the operation of the OR circuit 35. More specifically, if both capacitive occupant sensors 3 and 4 sense the presence of an individual, thereby actuating their corresponding capacitive occupant detecting circuits, the outputs to these detecting circuits, which appear as the outputs of exclusive OR circuits $22_3$ and $22_4$, are applied as two inputs to OR circuit 35 the output of which is coupled to retriggerable monostable multivibrator $30_3$. Similarly, when both mechanical occupant sensing switches 13 and 14 close simultaneously the associated monitoring circuit operates as if either mechanical occupant switch 14 has been closed.

The seat belt sensing and ignition interlock system of the present invention includes a further feature. This feature is known as the system bypass and allows for the vehicle operator to bypass the sensing and interlock system in case of emergency. During emergency conditions, it may become impossible to place a seat belt around each passenger. For example, an injured individual may be forced to lie down across several seat positions, making it impossible to buckle all the associated seat belts about him. Under these conditions, system bypass switch 500 is opened to block energization of relay CR2, as well as, relay CR1. This has the effect of disabling the entire system.

While the invention has been particularly shown and described with reference to a preferred embodiment

What is claimed is:

1. In a seat belt warning system for vehicles an occupant detector means for detecting the presence of an individual seated on the vehicle seat comprising:
   a variable capacitive means responsive to the presence of a seated occupant to assume a first value of capacitance and responsive to the absence of a seated occupant to assume a second value of capacitance;
   means for producing a series of electrical pulses having a first predetermined rise time;
   signal coincidence means having first and second inputs;
   first circuit means for supplying said series of electrical pulses directly to a first input of said coincidence means; and
   second circuit means including said variable capacitive means for supplying said series of electrical pulses to the second input of said coincidence means;
   said second circuit means constructed to supply output pulses to said coincidence means having the same rise time as the pulses supplied through said first circuit means to the first input of said coincidence means when said variable capacitance means assumes its second value;
   said second circuit means further constructed to alter the rise time of said pulses supplied to said coincidence means when said variable capacitive means assumes its first value;
   said altered rise time of said pulses being different from said predetermined rise time;
   said coincidence means responsive to the pulses supplied to its first and second input leads to provide an output of a first magnitude when said rise times are identical and to produce an output of a second magnitude when said rise times are different.

2. A seat belt warning system as in claim 1 comprising a third circuit means responsive to the fastening of said seat belt to generate a signal;
   and monitoring means constructed to detect the sequence of occurrence of said signal of said second magnitude from said coincidence means and the signal resulting from said fastening of said seat belt and to produce a signal enabling the operation of said vehicle in response to the occurrence of said signal of second magnitude followed by the occurrence of said seat belt fastening signal.

3. In a seat belt warning system for vehicles an occupant detector means for detecting the presence of an individual seated on the vehicle seat comprising;
   a variable capacitive means responsive to the presence of a seated occupant to assume a first value of capacitance and responsive to the absence of a seated occupant to assume a second value of capacitance;
   means for producing a series of electrical pulses having a predetermined shape;
   signal coincidence means having first and second inputs;
   first circuit means for supplying said series of electrical pulses directly to a first input of said coincidence means; and
   second circuit means including said variable capacitive means for supplying said series of electrical pulses to the second input of said coincidence means;
   said second circuit means constructed to supply output pulses to said coincidence means having the same shape as the pulses supplied through said first circuit means to the first input of said coincidence means when said variable capacitance means assumes its second value;
   said second circuit means further constructed to alter the shape of said pulses supplied to said coincidence means when said variable capacitive means assumes its first value;
   said altered shape of said pulses being different from the shape of said pulses supplied to said coincidence means from said first circuit means;
   said coincidence means responsive to the pulses supplied to its first and second input leads to provide an output of a first magnitude when said pulse shapes are identical and to produce an output of a second magnitude when said pulse shapes are different.

4. A seat belt warning system as in claim 3 comprising a third circuit means responsive to the fastening of said seat belt to generate a signal;
   and monitoring means constructed to detect the sequence of occurrence of said signal of said second magnitude from said coincidence means and the signal resulting from said fastening of said seat belt and to produce a signal enabling the operation of said vehicle in response to the occurrence of said signal of second magnitude followed by the occurrence of said seat belt fastening signal.

* * * * *